United States Patent [19]

Maronian

[11] Patent Number: 5,121,198
[45] Date of Patent: Jun. 9, 1992

[54] METHOD OF SETTING THE CONTRAST OF A COLOR VIDEO PICTURE IN A COMPUTER CONTROLLED PHOTOGRAPHIC FILM ANALYZING SYSTEM

[75] Inventor: Roupen H. Maronian, Rochester, N.Y.

[73] Assignee: Eastman Kodak Company, Rochester, N.Y.

[21] Appl. No.: 545,245

[22] Filed: Jun. 28, 1990

[51] Int. Cl.⁵ .............................................. G03F 3/10
[52] U.S. Cl. ........................................ 358/76; 358/80
[58] Field of Search ................ 358/76, 75, 80, 27, 358/29, 29 C, 169

[56] References Cited

U.S. PATENT DOCUMENTS

| | | | |
|---|---|---|---|
| 4,893,181 | 1/1990 | Yeomans | 358/80 |
| 4,899,216 | 2/1990 | Tatsumi et al. | 358/80 |
| 4,928,167 | 5/1990 | Tatsumi et al. | 358/80 |

OTHER PUBLICATIONS

Kodak Professional Video Analyzing Computer XL brochure, Eastman Kodak Company, 1988.

*Primary Examiner*—Leo H. Boudreau
*Assistant Examiner*—Andrew W. Johns
*Attorney, Agent, or Firm*—Heslin & Rotherberg

[57] ABSTRACT

A method of setting the contrast of a color video picture generated on a screen of a video display device from a developed photographic film image to achieve a match in visual appearance between the color video picture and an illuminated reference print of the image involves the automatic and interactive development of contrast table output values for each of three different colors in shadow and highlight regions. A base contrast table, the input value and base output value of an inflection point, and default values of user selectable contrast settings for the shadow region and highlight region for each of the three colors is stored in a computer memory and used to generate initial output values of the contrast table. The stored base contrast table, and the input value and base output value of the inflection point, in conjunction with user selected new contrast settings are employed to automatically develop new contrast table output values. The contrast table output values are downloaded to respective look-up tables which modify input electrical signals to the video display device to affect the contrast of the color video picture presented on the screen of the display device. The contrast settings can be adjusted until a match in visual appearance of the video picture with an illuminated reference print is achieved. The ultimate contrast settings of this calibration operation can be used by the same equipment in a regular analyzing mode.

5 Claims, 8 Drawing Sheets

| I | YD | | I | YD | |
|---|---|---|---|---|---|
| | BASE TRACE | CURVES E' + E'' (PERC1=PERC2= 2.00) | | BASE TRACE | CURVES E' + E'' (PERC1=PERC2= 2.00) |
| 0-60 | 0 | 0 | 93 | 54 | 30 |
| 61 | 0 | 0 | 94 | 56 | 32 |
| 62 | 2 | 0 | 95 | 58 | 34 |
| 63 | 3 | 0 | 96 | 60 | 36 |
| 64 | 5 | 0 | 97 | 61 | 38 |
| 65 | 7 | 1 | 98 | 63 | 40 |
| 66 | 9 | 1 | 99 | 65 | 42 |
| 67 | 10 | 1 | 100 | 66 | 44 |
| 68 | 12 | 2 | 101 | 68 | 46 |
| 69 | 14 | 2 | 102 | 70 | 49 |
| 70 | 15 | 3 | 103 | 71 | 51 |
| 71 | 17 | 3 | 104 | 73 | 54 |
| 72 | 19 | 4 | 105 | 75 | 56 |
| 73 | 20 | 4 | 106 | 77 | 59 |
| 74 | 22 | 5 | 107 | 78 | 61 |
| 75 | 24 | 6 | 108 | 80 | 64 |
| 76 | 26 | 7 | 109 | 82 | 67 |
| 77 | 27 | 8 | 110 | 83 | 69 |
| 78 | 29 | 9 | 111 | 85 | 72 |
| 79 | 31 | 10 | 112 | 87 | 75 |
| 80 | 32 | 11 | 113 | 88 | 78 |
| 81 | 34 | 12 | 114 | 90 | 81 |
| 82 | 36 | 13 | 115 | 92 | 84 |
| 83 | 37 | 14 | 116 | 94 | 88 |
| 84 | 39 | 16 | 117 | 95 | 90 |
| 85 | 41 | 17 | 118 | 97 | 94 |
| 86 | 43 | 19 | 119 | 99 | 97 |
| 87 | 44 | 20 | 120 | 100 | 100 |
| 88 | 46 | 21 | 121 | 102 | 103 |
| 89 | 48 | 23 | 122 | 104 | 107 |
| 90 | 49 | 25 | 123 | 105 | 110 |
| 91 | 51 | 26 | 124 | 107 | 113 |
| 92 | 53 | 28 | 125 | 109 | 117 |

FIG. 5A

| I | BASE TRACE | YD CURVES E'+ E'' (PERC1=PERC2=2.00) | I | BASE TRACE | YD CURVES E'+ E'' (PERC1=PERC2=2.00) |
|---|---|---|---|---|---|
| 126 | 111 | 120 | 159 | 167 | 222 |
| 127 | 112 | 123 | 160 | 168 | 224 |
| 128 | 114 | 126 | 161 | 170 | 227 |
| 129 | 116 | 130 | 162 | 172 | 229 |
| 130 | 117 | 132 | 163 | 173 | 231 |
| 131 | 119 | 136 | 164 | 175 | 234 |
| 132 | 121 | 140 | 165 | 177 | 236 |
| 133 | 122 | 142 | 166 | 179 | 239 |
| 134 | 124 | 146 | 167 | 180 | 241 |
| 135 | 126 | 149 | 168 | 182 | 243 |
| 136 | 128 | 153 | 169 | 184 | 245 |
| 137 | 129 | 155 | 170 | 185 | 247 |
| 138 | 131 | 159 | 171 | 187 | 249 |
| 139 | 133 | 162 | 172 | 189 | 251 |
| 140 | 134 | 165 | 173 | 190 | 253 |
| 141 | 136 | 168 | 174 | 192 | 254 |
| 142 | 138 | 172 | 175 | 194 | 255 |
| 143 | 139 | 174 | 176 | 196 | 255 |
| 144 | 141 | 178 | 177 | 197 | 255 |
| 145 | 143 | 181 | 178 | 199 | 255 |
| 146 | 145 | 185 | 179 | 201 | 255 |
| 147 | 146 | 187 | 180 | 202 | 255 |
| 148 | 148 | 190 | 181 | 204 | 255 |
| 149 | 150 | 194 | 182 | 206 | 255 |
| 150 | 151 | 196 | 183 | 207 | 255 |
| 151 | 153 | 199 | 184 | 209 | 255 |
| 152 | 155 | 202 | 185 | 211 | 255 |
| 153 | 156 | 205 | 186 | 213 | 255 |
| 154 | 158 | 208 | 187 | 214 | 255 |
| 155 | 160 | 211 | 188 | 216 | 255 |
| 156 | 162 | 214 | 189 | 218 | 255 |
| 157 | 163 | 216 | 190 | 219 | 255 |
| 158 | 165 | 219 | 191 | 221 | 255 |

FIG. 5B

| I | YD | | I | YD | |
|---|---|---|---|---|---|
| | BASE TRACE | CURVES E'+ E'' (PERC1=PERC2= 2.00) | | BASE TRACE | CURVES E'+ E'' (PERC1=PERC2= 2.00) |
| 192 | 223 | 255 | 224 | 255 | 255 |
| 193 | 224 | 255 | 225 | 255 | 255 |
| 194 | 226 | 255 | 226 | 255 | 255 |
| 195 | 228 | 255 | 227 | 255 | 255 |
| 196 | 230 | 255 | 228 | 255 | 255 |
| 197 | 231 | 255 | 229 | 255 | 255 |
| 198 | 233 | 255 | 230 | 255 | 255 |
| 199 | 235 | 255 | 231 | 255 | 255 |
| 200 | 236 | 255 | 232 | 255 | 255 |
| 201 | 238 | 255 | 233 | 255 | 255 |
| 202 | 240 | 255 | 234 | 255 | 255 |
| 203 | 241 | 255 | 235 | 255 | 255 |
| 204 | 243 | 255 | 236 | 255 | 255 |
| 205 | 245 | 255 | 237 | 255 | 255 |
| 206 | 247 | 255 | 238 | 255 | 255 |
| 207 | 248 | 255 | 239 | 255 | 255 |
| 208 | 250 | 255 | 240 | 255 | 255 |
| 209 | 252 | 255 | 241 | 255 | 255 |
| 210 | 253 | 255 | 242 | 255 | 255 |
| 211 | 255 | 255 | 243 | 255 | 255 |
| 212 | 255 | 255 | 244 | 255 | 255 |
| 213 | 255 | 255 | 245 | 255 | 255 |
| 214 | 255 | 255 | 246 | 255 | 255 |
| 215 | 255 | 255 | 247 | 255 | 255 |
| 216 | 255 | 255 | 248 | 255 | 255 |
| 217 | 255 | 255 | 249 | 255 | 255 |
| 218 | 255 | 255 | 250 | 255 | 255 |
| 219 | 255 | 255 | 251 | 255 | 255 |
| 220 | 255 | 255 | 252 | 255 | 255 |
| 221 | 255 | 255 | 253 | 255 | 255 |
| 222 | 255 | 255 | 254 | 255 | 255 |
| 223 | 255 | 255 | 255 | 255 | 255 |

FIG. 5C

METHOD OF SETTING THE CONTRAST OF A COLOR VIDEO PICTURE IN A COMPUTER CONTROLLED PHOTOGRAPHIC FILM ANALYZING SYSTEM

BACKGROUND OF THE INVENTION

1. Technical Field

This invention relates generally to computer controlled photographic film analyzing systems employing digital electronics and video displays, and more particularly, to a method for automatically and interactively developing contrast tables for use in such systems.

2. Background Information

In the professional and consumer photofinishing industry, there is a trend towards use of hybrid systems that merge silver halide photography and video imaging, to analyze developed film images and determine optimum exposure values for printing of such images. Generally, in such hybrid analyzer systems, a photographic film image is scanned to produce electrical signals proportionate to film density along the scan pattern. The electrical signals are processed and then inputted to a video display device such as a CRT monitor to present a video picture of the film image. The video picture is compared to a reference print of the image and the contrast of the video picture adjusted, in a calibration mode, until a match in visual appearance is achieved. The calibrated analyzer can then be used to view film images desired to be printed, to adjust the balance of the viewed images and to determine optimum exposure values (or times) for printing of said images on paper. The key to successful operation of such an analyzer is to ensure that the video picture is a true representation of what the printed image will look like when printed on particular paper.

Hybrid analyzer systems generally incorporate various subsystems including sensors, scanners, signal processors and video monitors. Sharpness, resolution, color, neutral scale and red (R), green (G), and blue (B) contrasts are examples of some critical color monitor parameters that are required for proper pictorial video imaging and reproduction. The hardware video drivers for each of the primary RGB electron guns in the video monitor require input signals that are tailored to control the electron flow to produce desired RGB contrast scales and acceptable pictorial video images. Each monitor input signal needs to be appropriately compensated and corrected for any subsystem contrast distortions from Aim, i.e. a reference print. Today, this is generally achieved through the use of RGB contrast tables.

An early hybrid analyzer system known as the Video Color Negative Analyzer employed analog circuitry to develop visually acceptable monitor contrast for pictorial video images. However, in such hardwired analog systems, it was difficult to accommodate changes in film type or paper. More recently, digital hybrid analyzer systems such as the Kodak ® Professional Video Analyzer Computer XL (hereinafter referred to as PVAC) have been developed to provide more flexibility in the handling of different film and paper types.

The PVAC scans negatives and slides and, using digital communications and processing transmits the image to a large video picture display. The PVAC is used in professional laboratories where film analyzing is critical as it effectively provides the correct set of RGB printer times for each negative and consequently minimizes photographic paper waste due to unacceptable prints. Neutral density (D) and RGB analyzer printing exposure numbers are the output of the PVAC used to control the RGB exposures in a subsequent printing station.

In digital analyzer equipment such as the PVAC, system contrast control and fine tuning is important to provide acceptable overall RGB tone scales of pictorial-video images. Poor video images can result if, for example, signal drift or hardware parameter variations exist between members of the same product line of equipment. Elaborate hardware feedback controls could be used to compensate for drift, but would be costly to implement. Furthermore, even if such hardware feedback control was employed, contrast fine-tuning could still be necessary. End user tastes often affect the monitor parameter settings for the video pictorial image, especially during the PVAC calibration process, where a video pictorial "match" to an Aim print is required. A match is attained when both images are subjectively deemed the same for overall color and density (i.e. image and print balance) and RGB tone scales.

In prior PVAC's, this match was sought to be achieved through the provision and storage in memory of multiple sets of predetermined contrast tables. A contrast table consists of ordered sets of consecutive integer input values and associated integer output values which define a contrast or tone scale.

In early versions of PVAC, multiple sets of discreet contrast tables (one for each color channel) had to be stored in memory. This approach either required large capacity memory or limited the number of contrast tables available to the user. Furthermore, contrast table selection required use of the video monitor screen and therefore necessitated flipping between the selection screen and the video picture presentation. Finally, the predetermined contrast tables did not always allow for the desired fine tuning of contrast scales.

A need thus exists for an improved contrast table generation method which allows for finer contrast adjustment, improved resolution, greater range of contrast settings and uninterrupted on-line, real time viewing of the contrast adjusted video picture.

SUMMARY OF THE INVENTION

This need is satisfied, the shortcomings of the prior art overcome and other benefits afforded, in accordance with the principles of the present invention, by the provision in PVAC or similar digital analyzing equipment of a capability for automatically and interactively developing new contrast table output values. More particularly, the present invention contemplates a method of setting the contrast of a color video picture generated on a screen of a video display device from a developed photographic film image to achieve a match in visual appearance between said color video picture and an illuminated reference print of said image. The method includes the steps of:

scanning an image on a developed photographic film along a scan pattern and producing therefrom a digital electrical output for each of three different colors, each digital electrical output consisting of a stream of binary words, the binary words of a stream representing film density for a respective one of said colors at consecutive pixel locations along the scan pattern;

automatically generating contrast table output values for each of said three different colors, said output values being associated respectively with individual consecutive input values, initial output values being selected so as to ensure that a color video picture of the image generated on the screen using said initial output values has a density range and contrast that approximates the density range and contrast of the reference print;

downloading contrast table output values for each of said colors into a look-up table associated with the respective color;

matching each binary word of the digital electrical output for a particular color to an input value of the look-up table associated with said color, and substituting the downloaded contrast table output value associated with the matched input value for the binary word of the digital electrical output to form a contrast compensated digital output for each color;

converting the output values of each contrast compensated digital output into corresponding analog signals;

driving the video display device with said analog signals to produce a color video picture of the film image on the screen;

visually comparing said color video picture to the reference print; and interactively and automatically developing new contrast table output values for at least one of said colors and downloading the new values into the look-up table associated with said color in order to adjust on-line the contrast of the color video picture on the screen to match the visual appearance of the reference print.

Preferably, all contrast table output values are generated from a single base contrast table comprising ordered sets of consecutive integer input values and associated base output values. An intermediate one of said sets is chosen as an inflection point separating the sets into a shadow region grouping and a highlight region grouping respectively. The base contrast table, and the input value and base output value of the inflection point are stored in a computer memory along with default values of user selectable contrast settings for the shadow region grouping and highlight region grouping for each of the three different colors. This stored data is used to automatically generate initial output values for downloading to the contrast look-up tables. New contrast table output values are generated from the stored base contrast table, the input value and base output value of the inflection point and from user selected new contrast settings.

In accordance with a further aspect of the invention, all contrast table output values are generated in accordance with the following relationship:

$$YD = YDAT(I) + YDAT(I) \cdot PERC$$

where $$PERC = -PERC1 \left[ \frac{INF - I}{INF + \Delta} \right]$$

for input values I in the shadow region grouping ($0 \leq I \leq INF$), and where $$PERC =$$

$$PERC2 \left[ \frac{I - INF}{2^N - 1 - INF - \Delta} \right] \left[ \frac{2^N - 1 - YDAT(I)}{2^N - 1 - YDAT(INF) - \Delta} \right]$$

for input values in the highlight region grouping ($INF < I \leq 2^N - 1$), and where N represents the number of bits used in analog to digital signal conversion, I represents each consecutive input value from 0 to $2^N - 1$ of the contrast table, INF is the input value of the inflection point PERC1 is the contrast setting for the shadow region grouping, PERC2 is the contrast setting for the highlight region grouping, YDAT(I) is the base table output value for the input value I, YDAT(INF) is the base table output value for the inflection point, PERC represents a general contrast setting multiplier, and YD represents the respective contrast table output value downloaded to the look-up table for each input value I.

Accordingly, a principal object of the present invention is to facilitate on-line, real time, automatic, interactive and virtually unlimited contrast adjustment of a video picture in digital analyzing systems. Advantages of the present invention include improved resolution, greater range of contrast settings and the use of less memory space.

BRIEF DESCRIPTION OF THE DRAWINGS

These and other objects, features and advantages of the present invention will be more readily understood from the following detailed description, when read in conjunction with the accompanying drawings in which:

FIGS. 5A, 5B and 5C present a table of input values and output values for the base trace and curves depicted in FIG. 4;

DETAILED DESCRIPTION

The contrast setting method of the present invention which advantageously incorporates automatic and interactive development of contrast table output values will now be described in the context of a PVAC, although it may be employed with other digital analyzing equipment.

Figure 1:
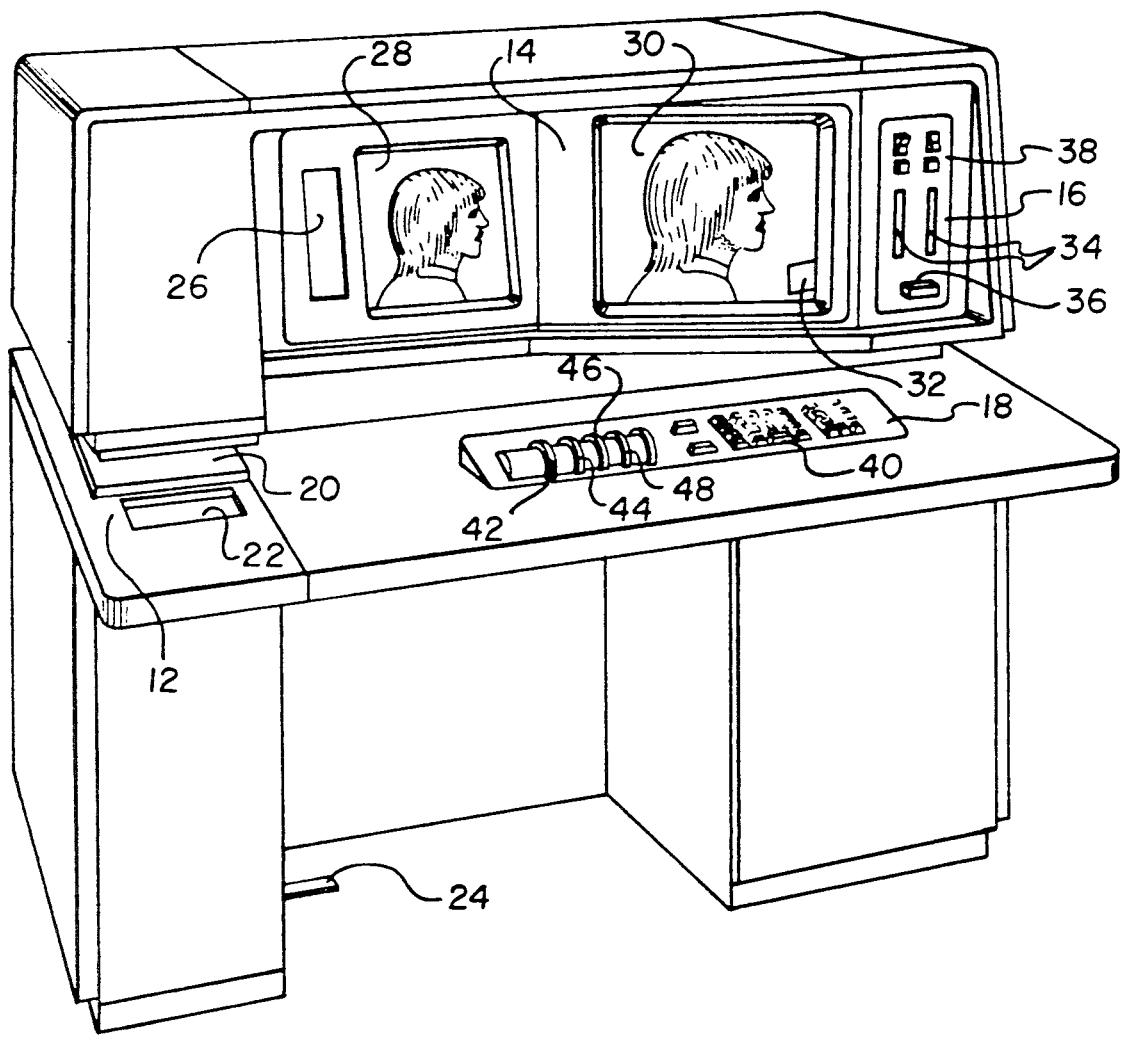
FIG. 1 is a perspective view of a Professional Video Analyzing Computer (PVAC)

A Professional Video Analyzing Computer XL, available from the Eastman Kodak Company of Rochester, New York, is depicted in FIG. 1. The PVAC 10 is intended for use in professional film finishing laboratories and allows the operator to evaluate color negatives and slides and automatically determine density and color values for photographic exposure that will produce optimum prints. The PVAC includes negative loading area 12, a picture display area 14, a disk drive and switch area 16, and an operator controls area 18.

The negative loading area of the PVAC contains a film gate 20 and finger cutout 22. The film gate holds the negative or other developed photographic film image to be analyzed. The finger cutout 22 allows the operator's fingers to position the film properly in the film gate. Film gate 20 generally consists of two separable pieces of glass which sandwich the film image to be analyzed. A foot treadle 24 permits the operator to open the film gate by foot.

The picture display area 14 of the PVAC includes a video data display 26, a video picture display 28, and a reference print viewer 30. Data display 26 typically shows the exposure values for density, red, green and blue; the film type number; and the order, roll, and frame numbers for the negative being analyzed. Picture display 28 presents the electronically generated color representation of the image on the film, and also menus and messages. The information in data display 26 and the pictorial presentation in picture display 28 are presented on the screen of a CRT monitor. The video picture can be compared to a standard or reference print, or "Aim", placed in the print viewer 30, for matching of visual appearance, e.g. in a calibration mode. Print viewer 30 includes standard illumination (not shown) and a brightness control 32.

Disk drive and switch area 16 includes a pair of disk drives 34, a data cartridge holder 36 and various switches and indicator lamps generally identified by reference number 38. Disk drives 34 can be used to enter data into the PVAC computer and to store setup data. Data cartridge holder 36 allows the operator to insert a data cartridge so that the PVAC can report the data from an analysis to the data cartridge. A power switch, restart switch, print viewer lamp switch, and error indicator and standby indicator lamps may be advantageously included in switch area 38.

Operator controls area 18 allows the operator to communicate and control the analyzer, and is composed of keyboard 40 and density and RGB color control wheels 42, 44, 46 and 48 respectively. Keyboard 40 provides the basic communications path to the PVAC for the operator and supports a host of different functions. The density and color control wheels 42, 44, 46 and 48 allow the operator to adjust the balance and brightness of the video picture display 28. The exposure values in data display 26 change accordingly. Rotation of density control wheel 42 causes the overall picture display 28 to become darker or lighter. Rotation of a color control wheel can be used to vary the brightness of that color in the picture display 28. The wheels can also be used in some setups, including a calibration mode described hereinafter.

In the normal analyzing mode, PVAC 10 scans the developed photographic film image placed in the film gate 20 and generates therefrom a color video picture in picture display 28. Related exposure and image identification information is concurrently presented in the data display 26. Rotation of density and/or color control wheels 42, 44, 46 and 48 allows the operator to adjust the balance and/or brightness of individual RGB colors over the whole picture equally in order to obtain the desired visual appearance of the video picture in picture display 28. Analyzer values from the PVAC can then be used to print the image on a particular type of paper.

In the regular analyzing mode, the contrast of the video picture is not adjusted and the reference print viewer 30 is not normally employed. The objective of analysis is to obtain exposure values which will permit the printing of an optimum print of the image. PVAC 10 also supports a calibration mode which facilitates fine tuning of the contrast of the video picture to ensure that the video display presents a true representation of how an image will appear when printed on particular paper. The calibration mode thus ensures the success of the normal analyzing operation of the PVAC.

In the calibration process, a video image presented on the picture display 28 is visually compared to an illuminated reference print on the print viewer 30 and the contrast or tone scales for the RGB colors are interactively and automatically adjusted to achieve a match in visual appearance. In the calibration mode, density wheel 42 and color control wheels 44, 46 and 48 allow for operator adjustment of various contrast settings as more fully described hereinafter.

Figure 2:
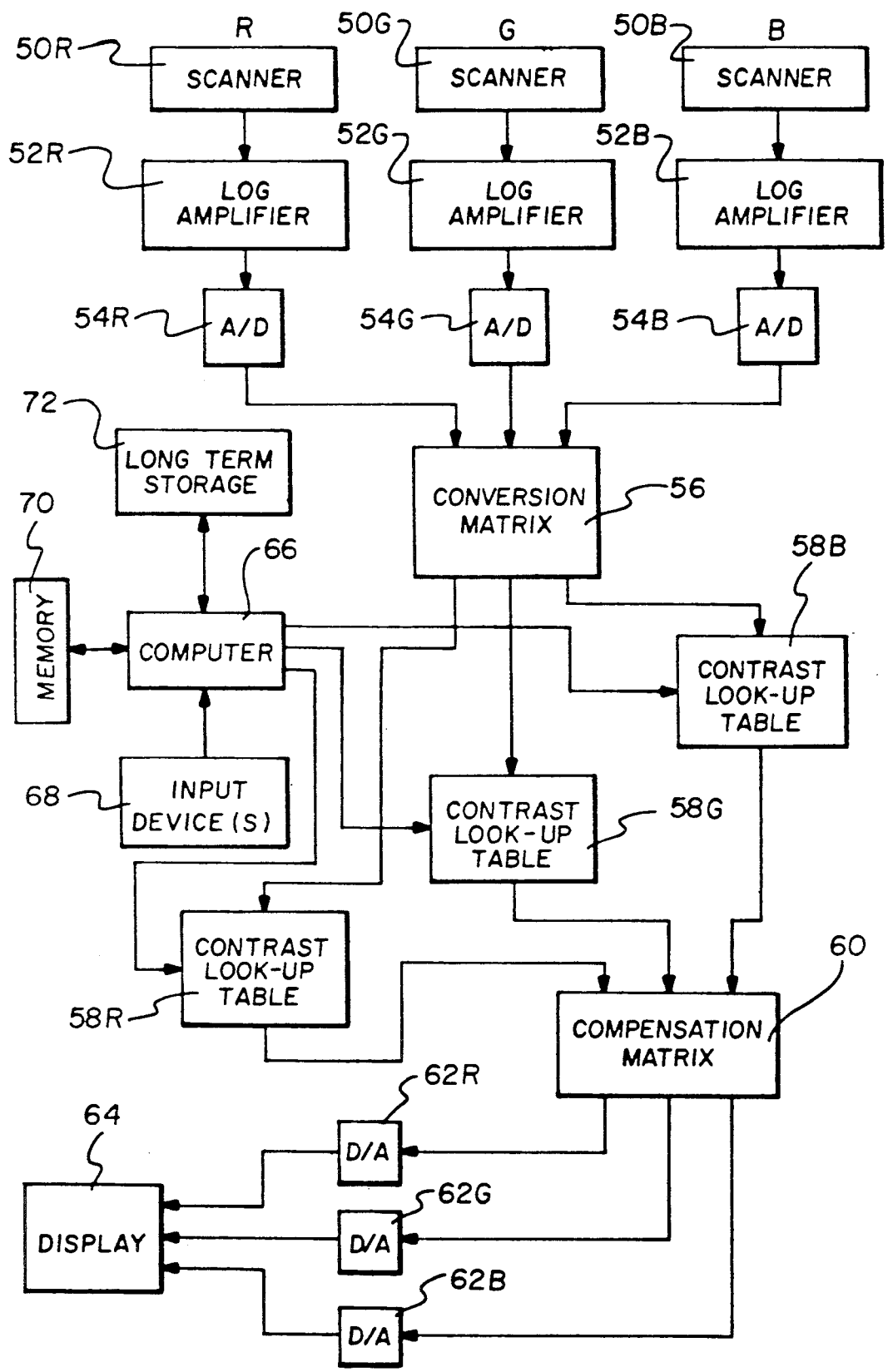
FIG. 2 is a block diagram of the processing pipeline of a digital analyzer system.

FIG. 2 schematically illustrates the PVAC hardware employed to produce a color video picture from a scanned film image. The equipment includes three parallel channels labeled R, G, and B associated with the separate colors red, green and blue, respectively. Alternatively, other color systems may be used.

Initially a negative or other developed photographic film image (not shown) is scanned, along a scan pattern, by a set of scanners 50R, 50G, and 50B associated with the respective R, G, and B channels. The PVAC typically employs a flying spot scanner to line scan the film image and three photo multiplier tubes which each produce a first analog electrical signal representative of film transmittance along the scan pattern for the respective color. Other scanners, for example employing charge coupled devices, may be used instead.

The first analog electrical signals from scanners 50R, 50G and 50B are provided to respective log amplifiers 52R, 52G and 52B of the associated color channel. In known fashion, the log amplifiers produced a second analog electrical signal proportional to film density along said scan pattern for each of the three different color channels. The second analog electrical signals from log amplifiers 52R, 52G and 52B are applied to respective analog to digital converters 54R, 54G and 54B which convert each second analog electrical signal into a corresponding digital electrical output. Each digital electrical output from an analog to digital converter consists of a stream of binary words. The binary words of a stream representing film density for the associated color channel at consecutive pixel locations along the scan pattern.

These digital electrical outputs are then provided to a common conversion matrix 56. Matrix 56 serves to convert the binary words of each incoming digital electrical output into exposure values. The RGB exposure values output from the matrix 56, in digital form, represent the analyzer numbers which can be sent to a printer and are also inputted to respective contrast look-up tables 58R, 58G and 58B. The contrast look-up tables provide a contrast adjustment to the signals in the respective R, G, and B color channels. This contrast adjustment compensates for overall system contrast/gain deficiencies, drift, etc.

The outputs of the contrast look-up tables are provided to a common compensation matrix 60 which serves to compensate for the phosphor spectral characteristics of the video display device. The three channel outputs of conversion matrix 60 are passed through respective digital to analog converters 62R, 62G and 62B and then to a video display device 64 where, in well known fashion they produce a color video picture of the film image on a screen of the display device.

Display device 64 typically comprises a color CRT monitor. Conversion matrix 56 and contrast look-up tables 58R, 58G and 58B are implemented on a film matrix circuit board of the PVAC, while compensation matrix 60 resides on a paper matrix circuit board. These boards are commercially available as part of the PVAC from the Eastman Kodak Corporation.

As mentioned earlier, the contrast look-up tables serve to adjust the digital signals on each channel to compensate for overall system contrast deficiencies, drift and the like. Each contrast look-up table can be implemented in conventional fashion with hardware electronic digital circuitry which associates a particular output digital value with a respective associated input value. The input set is a sequence of whole numbers from 0 to $2^N - 1$ where N is the number of bits used in the analog to digital signal conversion. The output value associated with each of the consecutive input values is downloaded to each contrast look-up table by a PVAC computer 66. Input devices 68 (e.g. keyboard 40 and control wheels 42, 44, 46 and 48) of the operator controls area 18 are connected to computer 66. Computer memory 70 and a long-term storage device 72 store data and communicate such data bidirectionally with computer 66. The fashion in which computer 66 in conjunction with memory 70 and input devices 68 automatically and interactively develop contrast table output values for downloading to contrast look-up tables 58R, 58G and 58B, in accordance with the principles of the present invention, will now be described in detail.

Figure 3:
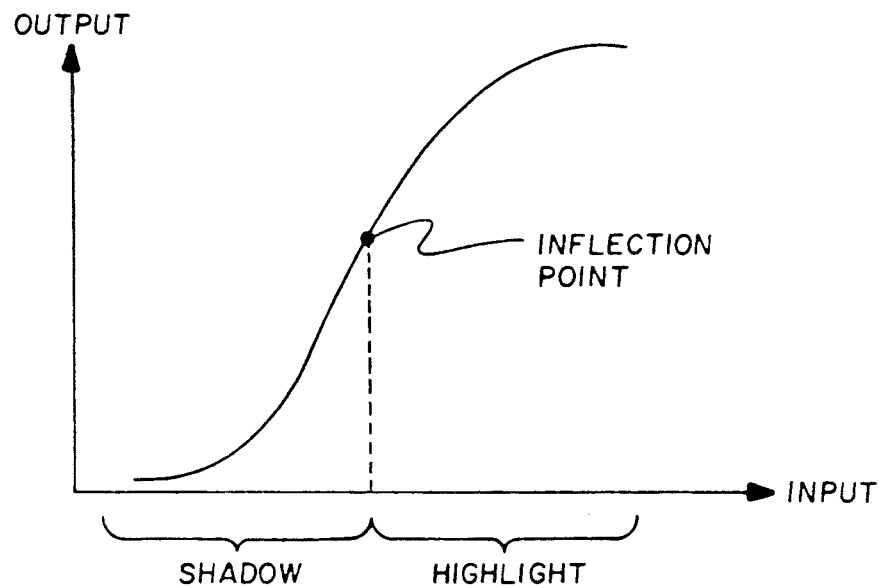
FIG. 3 is a generalized plot of contrast table values.

In FIG. 3, a contrast scale or table is schematically shown as a plot of the relationship between all of the allowed input values (along the horizontal axis) versus the corresponding output values (along the vertical axis). The range of the input values and of the output values typically is the same, e.g. from 0 to $2^N - 1$. A contrast table consists of ordered sets of consecutive integer input values and associated output values. An intermediate one of said sets is designated as an inflection point which separates the sets and curve, as shown in FIG. 3 into two basic regions. The upper region is designated as a "highlight region" where most of the whites to greys would fall, while the lower region contains most of the shadow areas. A similar curve and corresponding contrast table is employed for each RGB color.

In prior PVAC's, contrast adjustment required the storage in memory of multiple contrast tables for each color. The method of the present invention overcomes this shortcoming by allowing automatic development of initial and new RGB contrast table output entries from a single base contrast table stored in memory.

Figure 4:
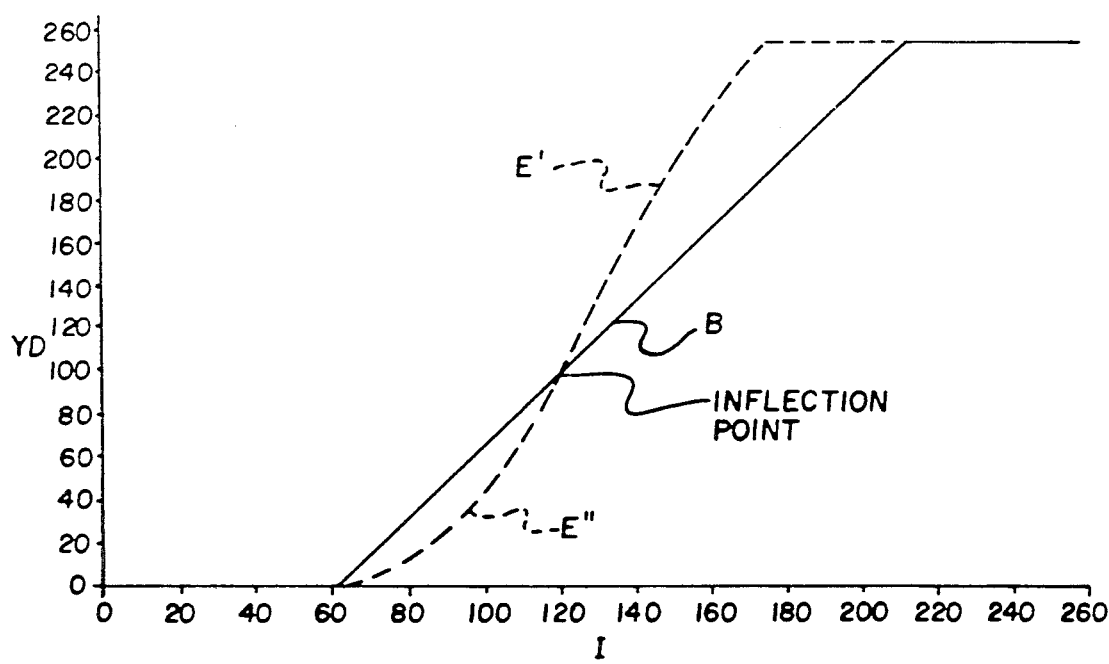
FIG. 4 is a graph of a base trace B and contrast adjustment curve generated therefrom, useful in understanding the principles of the present invention.

Referring now to FIG. 4, in accordance with the principles of the present invention, a desired base trace B is defined. In the example of FIG. 4 where N=8, the base trace B comprises a straight line extending between coordinates (61,0) and (210,255). The remaining output values are set to 0 for each of the input values (I) from 0 to 61 and to an output value of 255 for each input value from 210 to 255. A pivot or inflection point is selected at I=INF=120. A base contrast table corresponding to base trace B consisting of ordered sets of consecutive integer input values (I) extending from 0 to 255 and the associated output values shown in the graph of FIG. 4 and listed in tabular form under the column headed "BASE TRACE" of FIGS. 5A, 5B and 5C is stored in computer memory.

Figure 7:
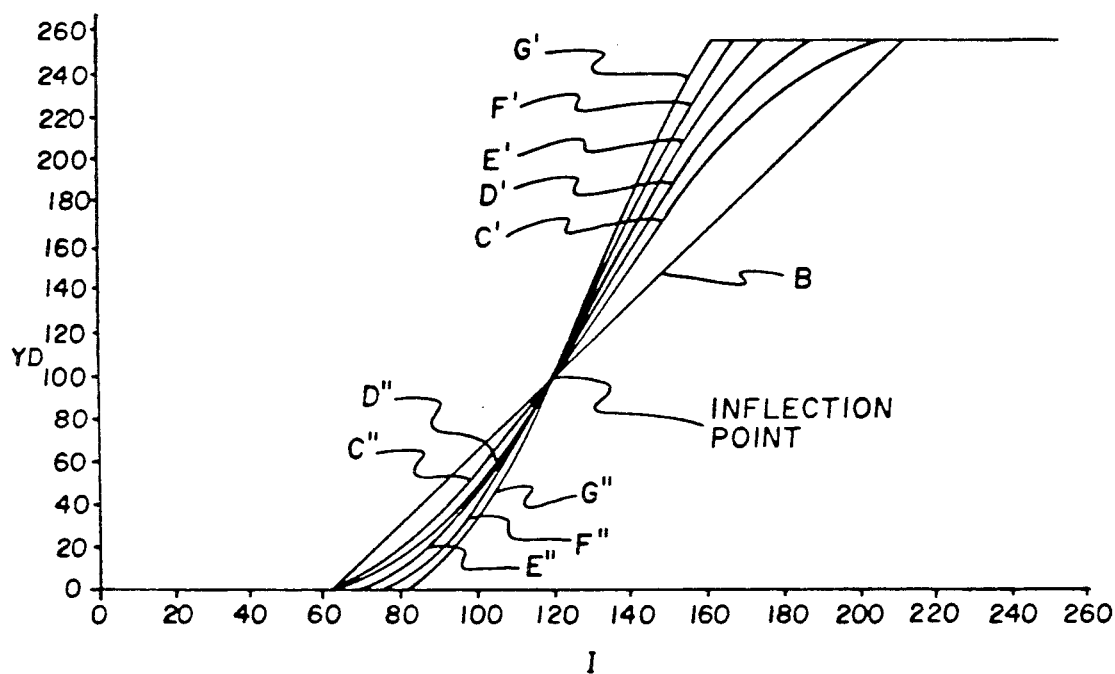
FIG. 7 is a plot of a family of contrast adjustment curves generated from a base trace in accordance with the principles of the present invention.

From the base contrast table, various sets of related contrast table output values can be automatically and interactively developed which represent a family of related contrast curves as shown in FIG. 7. Each such curve passes through the inflection point and has an upper highlight region section and a lower shadow region section. The divergence of the contrast curve from the base trace in the highlight and shadow regions is user selectable as more fully explained hereinafter. Selection of different base traces and variations in inflection point allow generation of a wide variety of different families of contrast curves.

In accordance with the principles of the present invention, contrast table output values for each color channel are developed by the PVAC computer from the base contrast table values stored in memory, the input and base output value for the inflection point and from user selectable contrast settings for the shadow region and highlight region respectively for each of the three colors. Initial contrast table output values are based upon default values of the contrast settings; which default values are stored in memory. The default values are selected so as to ensure that a color video picture of the image generated on the display screen using said initial output values has a density range and contrast that approximates the density range and contrast of the reference print.

In FIG. 4, a contrast curve labeled E' in the highlight region and E" in the shadow region is depicted which could be selected to represent the initial output values of a contrast table. In this example, the contrast setting in the highlight region and shadow region happen to be set to the same default value, i.e. 2.00, but they need not be. Corresponding initial output values are tabulated in the table of FIGS. 5A, 5B and 5C.

Figure 6:
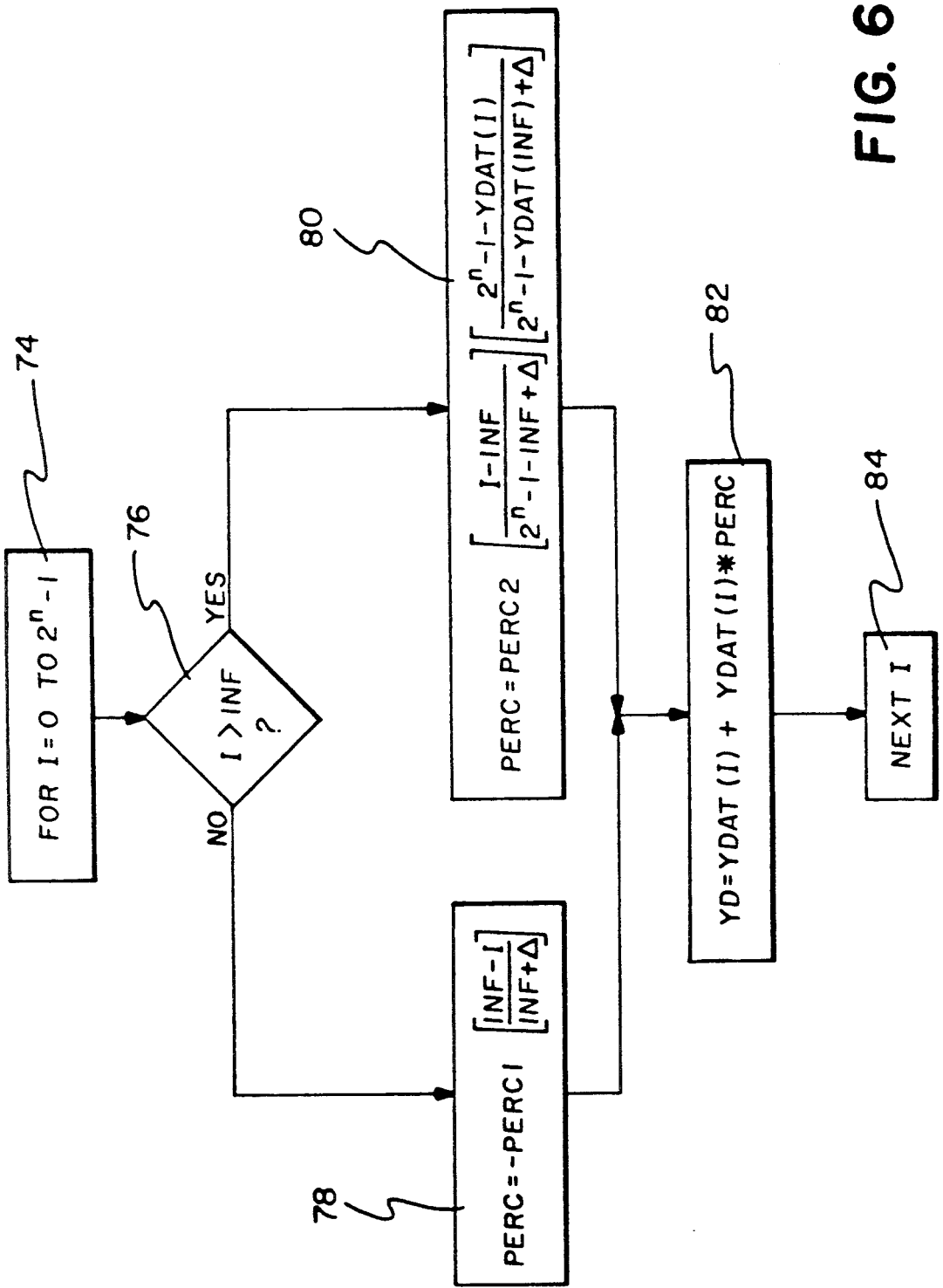
FIG. 6 is a flow chart illustrating a preferred method for automatically developing contrast table output values in accordance with the principles of the present invention.

The presently preferred approach for automatically and interactively developing initial and new contrast table output values is depicted in the flowchart of FIG. 6. As shown therein, each input value I over the range of 0 to $2^N - 1$ (Box 74) is, in turn, compared to the input value INF of the inflection point (inquiry 76). If input value I is less than or equal to the input value INF of the inflection point, then flow continues to box 78 where a contrast setting multiplier PERC is calculated in accordance with the following formula $$PERC = -PERC1 \left[ \frac{INF - I}{INF + \Delta} \right]$$

where PERC1 is the contrast setting for the shadow region and comprises a default value for the initial contrast table output values or a user selectable setting for new output values of the contrast table, and where $\Delta$ represents a positive number much smaller than 1 but greater than 0 which is employed to prevent denominators from going to 0 for certain combinations of N and INF values.

If the input value I is greater than the input value INF of the inflection point, then contrast setting multiplier PERC is calculated, in step 80, according to the following equation:

$$PERC = PERC2 \left[ \frac{I-INF}{2^N-1-INF+\Delta} \right] \left[ \frac{2^N-1-YDAT(I)}{2^N-1-YDAT(INF)+\Delta} \right]$$

where PERC2 is the contrast setting for the highlight region and consists of a default value for generation of initial output values or a user selectable setting for development of new output values of the contrast table; YDAT(I) is the base table output value for the input value I, and YDAT(INF) is the base table output value for the inflection point.

The contrast setting multiplier PERC, calculated in accordance with step 78 for the shadow region or step 80 for the highlight region is then used, as shown in step 82, to calculate the contrast table output value YD to be downloaded to the look-up table for the particular input value I in accordance with the following equation:

$$YD = YDAT(I) - YDAT(I) \cdot PERC$$

As indicated by step 84, the described process repeats for each consecutive input value until a full complement of output values are developed for the contrast table at the specified contrast settings for the shadow and highlight regions for each color.

The operator controls area 18 of the PVAC can be used by the operator to independently adjust the contrast settings for the shadow region and highlight region for each of said three colors, when the PVAC is operated in the calibration mode. A command entered via keyboard 40 determines whether the operator wishes to adjust the contrast in the shadow region or the highlight region. Rotation of the appropriate color wheel 44, 46 or 48 will then affect a change in the contrast setting for the selected region for the respective color channel. New contrast table output values will then be automatically developed by the PVAC computer in the manner described above and these new output values downloaded to the appropriate contrast look-up table resulting in a real time, on-line adjustment of the video picture presented on the display screen. In a similar fashion, further contrast adjustments for individual colors can be made by the operator until a match in visual appearance of the displayed video picture with an illuminated reference print is achieved. Rotation of control wheel 42 will cause concurrent equal adjustment of the contrast setting of all three color channels in either of the selected highlight or shadow regions.

FIG. 7 illustrates a family of contrast curves that can be generated from base trace B. Curves C', D', E', F' and G' represent the contrast table output in the highlight region when PERC2 is set equal to 1.00, 1.50, 2.00, 2.50 and 3.00 respectively. Similarly, curves C", D", E", F" and G" represent the contrast table outputs in the shadow region when PERC1 is set equal to 1.00, 1.50, 2.00, 2.50 and 3.00 respectively. The ultimate contrast setting for the highlight region and the shadow region for each color channel will be selected by the operator to achieve a match in visual appearance of the video picture with the illuminated reference print. These ultimate contrast settings may be the same or different for the different regions and the different color channels. The ultimate contrast settings can be saved by the PVAC and are used by this equipment in the normal analyzer mode.

The PVAC computer can be readily and simply programmed to implement the automatic an interactive development of contrast table output values in accordance with the principles of the present invention. An exemplary implementing program written in IBM PC Computer BASIC (Version 3.0) language follows. In this example N=8 and particular $\Delta$ values are employed. CINT is a known routine that converts calculated values to the nearest integer.

```
100   FOR I = 0 TO 255
110   IF I > INF THEN 150
120   PERC = - PERC1 * (INF - I)/(INF + .01)
130   YD = YDAT(I) + YDAT(I) * PERC
140   GO TO 170
150   PERC = PERC2*(I - INF)/(255 - INF + .01)*(255 -
      YDAT(I))/(255 - YDAT(INF) + .00001)
160   GO TO 130
170   IF YD < = 255 THEN 190
180   YD = 255
190   IF YD > = 0 THEN 210
200   YD = 0
210   YD = CINT(YD)
220   PRINT YD
230   NEXT I
240   END
```

From the foregoing description, it will be apparent that a method for fine tuning the contrast of a video image in digital analyzing systems has been developed which affords significant advantages. The method permits on-line, real time, automatic and interactive contrast adjustment to compensate for all system contrast gain deficiencies, drift, etc. Compared to prior techniques, the method of the present invention provides improved resolution and greater range of contrast settings, while significantly reducing memory requirements. The method which takes advantage of existing equipment is readily implemented and easy to use.

Although specific embodiments of the invention have been described herein and depicted in the accompanying drawings, it will be apparent to those skilled in the art that various modifications, substitutions, additions and the like can be made without departing from the spirit of the invention, the scope of which is defined by the claims appended hereto.

What is claimed is:

1. A method of setting the contrast of a color video picture generated on a screen of a video display device from a developed photographic film image to achieve a match in visual appearance between said color video picture and an illuminated reference print of said image, comprising the steps of:

scanning an image on a developed photographic film along a scan pattern and producing therefrom a digital electrical output for each of three different colors, each digital electrical output consisting of a stream of binary words, the binary words of a stream representing film density for a respective one of said colors at consecutive pixel locations along the scan pattern;

storing in a computer memory a base contrast table, an input vale and base output value of an inflection point, and default values of user selectable contrast settings for a shadow region grouping and a highlight region grouping for each of said three colors, said base contrast table comprising ordered sets of consecutive integer input values and associated base output values, said inflection point comprising an intermediate one of said sets, said inflection point separating said sets into said shadow region grouping and said highlight region grouping respectively;

automatically generating contrast table output values for each of said three different colors, said output values being associated respectively with individual consecutive integer input values, initial output values being selected so as to ensure that a color video picture of the image generated on the screen using said initial output values has a density range and contrast that approximates the density range and contrast of the reference print, said initial output values being generated from the base contrast table, default values of the contrast settings, and input value and base output value of the inflection point stored in memory;

downloading contrast table output values for each of said colors into a look-up table associated with the respective color;

matching each binary word of the digital electrical output for a particular color to an input value of the look-up table associated with said color, and substituting the downloaded contrast table output value associated with the matched input value for the binary work of the digital electrical output to form a contrast compensated digital output for each color;

converting the output values of each contrast compensated digital output into corresponding analog signals;

driving the video display device with said analog signals to produce a color video picture of the film image on the screen;

visually comparing said color video picture to the reference print; and interactively and automatically developing new contrast table output values for at least one of said colors and downloading the new values into the look-up table associated with said color in order to adjust on-line the contrast of the color video picture on the screen to match the visual appearance of the reference print, said new contrast table output values being generated from the stored base contrast table, the input value and base output value of the inflection point and from user selected new contrast settings and wherein all contrast table output values are generated in accordance with the following relationship:

$$YD = YDAT(I) + YDAT(I) \cdot PERC$$

where $$PERC = -PERC1 \left[ \frac{INF - I}{INF + \Delta} \right]$$

for input values in the shadow region grouping (where $0 \leq I \leq INF$) and where $$PERC =$$

$$PERC2 \left[ \frac{I - INF}{2^N - 1 - INF + \Delta} \right] \left[ \frac{2^N - 1 - YDAT(I)}{2^N - 1 - YDAT(INF) - \Delta} \right]$$

for input values in the highlight region grouping (where $INF < I \leq 2^N - 1$) and where I represents each consecutive input value from 0 to $2^N - 1$ of the contrast table, N represents the number of bits used in analog to digital signal conversion, INF is the input value of the inflection point PERC1 is the contrast setting for the shadow region grouping, PERC2 is the contrast setting for the highlight region grouping, YDAT(I) is the base table output value for the input value I, YDAT(INF) is the base table output value for the inflection point, $\Delta$ represents a positive number much smaller than 1, but greater than zero, PERC represents a general contrast setting multiplier, and YD represents the respective contrast table output value downloaded to the look-up table for each input value I.

2. The method of claim 1 wherein the step of interactively and automatically developing new contrast table output values for at least one of said colors comprises user selection of a new contrast setting for at least one of the highlight region grouping and shadow region grouping for at least one of said colors.

3. The method of claim 2 further comprising the step of simultaneous user selection of identical contrast setting adjustments of all three colors for one of the shadow region grouping and highlight region grouping.

4. The method of claim 2, further comprising the steps of:
converting the binary words of each digital electrical output into exposure values; and
further compensating the contrast compensated digital output for each color to compensate for phosphor spectral characteristics.

5. The method of claim 4 wherein said scanning step comprises:
scanning the image on the developed photographic film to produce a first analog electrical signal representative of film transmittance along the scan pattern for each of said three different colors;
applying each first analog electrical signal to a logarithmic amplifier to produce a second analog electrical signal proportional to film density along said scan pattern for each of said three different colors; and
converting each second analog electrical signal into a corresponding digital output.

* * * * *